Figure 1:
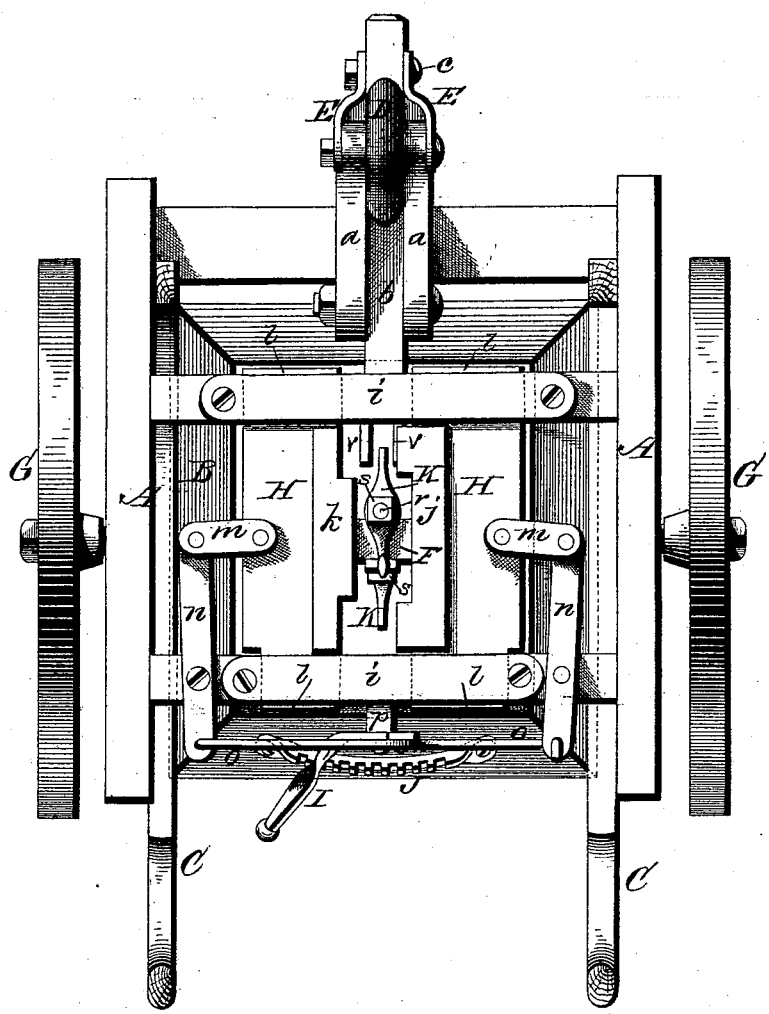

(No Model.) 2 Sheets—Sheet 1.

J. M. LINDSEY.
FERTILIZER DISTRIBUTER.

No. 348,023. Patented Aug. 24, 1886.

Witnesses:
Jas. E. Hutchinson
L. L. Miller

Inventor.
John M. Lindsey,
per Chas. H. Fowler
Attorney.

(No Model.) 2 Sheets—Sheet 2.
J. M. LINDSEY.
FERTILIZER DISTRIBUTER.
No. 348,023. Patented Aug. 24, 1886.
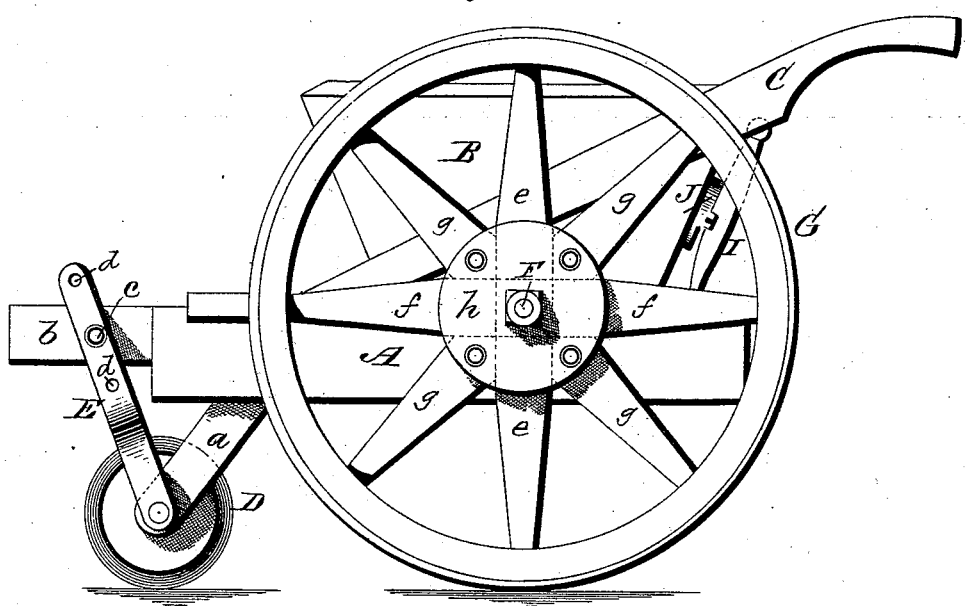
Witnesses:
Jas. E. Hutchinson
L. L. Miller
Inventor.
John M. Lindsey.
per Chas. H. Fowler,
Attorney.

United States Patent Office.

JOHN MARIAN LINDSEY, OF CRYSTAL SPRINGS, GEORGIA.

FERTILIZER-DISTRIBUTER.

SPECIFICATION forming part of Letters Patent No. 348,023, dated August 24, 1886.

Application filed April 12, 1886. Serial No. 198,521. (No model.)

*To all whom it may concern:*

Be it known that I, JOHN MARIAN LINDSEY, a citizen of the United States, residing at Crystal Springs, in the county of Floyd and State of Georgia, have invented certain new and useful Improvements in Fertilizer-Distributers; and I do hereby declare that the following is a full, clear, and exact description of the same, reference being had to the annexed drawings, making a part of this specification, and to the letters and figures of reference marked thereon.

Figure 1 of the drawings is an under side plan view of my invention; Fig. 2, a side elevation thereof; Fig. 3, a detail top plan view of the interior of the hopper, and Fig. 4 a detail end view of the rotary axle with the agitators connected thereto.

The object of the present invention is to provide a simple, practical, and easily-operating distributer for fertilizers; and it consists in certain details of construction, substantially as shown in the drawings, and hereinafter described and claimed.

In the accompanying drawings, A represents the frame of the machine, of any desirable construction, to which the hopper B is connected and supported, said frame having suitable handles, C, attached thereto.

To the forward end of the frame A is connected the caster-wheel D, by means of the arms $a$, pivoted at their upper ends to the sides of the beams $b$, their lower ends having connected thereto the stationary axle upon which the wheel is mounted.

To the lower ends of the arms $a$ are connected the ends of stays E, the opposite ends thereof being adjustably connected to the sides of the beam $b$, by bolt $c$ entering one of a series of perforations, $d$, in the stays, thereby making provision for the raising or lowering of the wheel, as circumstances require, to change the angle of the frame A.

The main driving-axle F has its bearings in the sides of the frame A, and has rigidly connected to its extremities wheels G. The spokes $ef$ of the wheels are formed of a single piece and overlap each other at their center, and the spokes $g$ are shaped at their inner ends to nicely fit between the juncture of the spokes $ef$, as shown in dotted lines, Fig. 2, and the spokes are firmly held in place by clamping-disks $h$, and bolts and nuts, thereby forming a strong and durable wheel.

Upon the under side of the hopper B are guides $i$, for connecting thereto gage-plates H, which form the bottom of the hopper, and are provided, respectively, with notched and tongued re-enforce bars $j$ $k$, to form a tight joint between the plates when brought together to close the bottom of the hopper. The gage-plates H at their extremities have downwardly-projecting flanges $l$, which come in contact with the outer edges of the guides $i$, thereby holding them more securely in place from lateral displacement, and rendering them more easy and perfect in their operation. To these gage-plates H are pivoted one end of links $m$, and the opposite ends of the links are in like manner pivoted to arms $n$, which are in turn pivoted to the frame of the machine. To the rear ends of the arms $n$ are connected one end of rods $o$, the inner or opposite ends of the rods being pivoted to the lower end of the hand-lever I, which is pivoted to a bracket, $p$, on the rear end of the frame A.

By means of the lever I the plates H may be operated to regulate the discharge-opening in the bottom of the hopper or close it as desired, the plates being held in their adjusted position by the lever engaging with the notches in a segmental rack-bar, J, secured to the rear end of the frame.

That portion of the axle F located within the hopper B is formed square, and connected thereto are the agitators K, in the following manner. The agitators K are each formed with a screw-threaded shank, $r$, and a hole, $s$, of a size to receive the shank of its fellow agitators, nuts $s$ being screwed on the extremities of the shanks to firmly clamp the four agitators together, as shown in Fig. 4. A cushion, $t$, is placed between each shank of the agitators and the sides of the axle, thereby allowing the agitators to give or yield to any great pressure brought against them, these cushions being of wood or any other desirable material.

The agitators K can be readily removed and replaced by new ones, by unscrewing the nuts $s$, should any of them become broken or injured. This means of connecting the agitators to the axle dispenses with the use of a hub for attaching thereto the agitators. Thus the agitators are brought nearer to the center of axle, which gives them more force in grinding hard substances, and giving more room for the fertilizer to feed itself through the opening in the bottom of the hopper. In addition to the agitators I provide the axle F at each side of said agitators with supplemental agitators, $u$.

From the interior side of the hopper B project horizontally spikes $v$, to act as cleaners for the agitators K; also the longitudinal and parallel rods L, secured to the interior sides of the hopper, prevent coarse and unpulverized fertilizer from passing out through the bottom of the hopper when the gage-plates are opened wide.

If preferred, the spikes $v$ may be formed on a plate and the plate fastened to the interior side of the hopper, or attached to the plate in any well-known manner.

The agitators K, passing between the spikes $v$, assist the agitators in acting on the fertilizer to thoroughly pulverize it.

Having now fully described my invention, what I claim as new, and desire to secure by Letters Patent, is—

1. In a fertilizer-distributer, a suitable frame-hopper and wheels, in combination with the driving-axle thereof, agitators having screw-threaded shanks and holes therein, the shank of one agitator entering the hole of another and clamped together around the axle by nuts engaging with the screw-threaded ends of the shanks, substantially as and for the purpose set forth.

2. In a fertilizer-distributer, a suitable frame having a hopper connected thereto, provided with longitudinal rods extending across the interior thereof, and spikes projecting from the front side thereof, in combination with gage-plates having upon their under side notched and tongued re-enforce bars, means for operating the gage-plates, consisting of a lever and toothed rack-bar, and agitators connected to the driving-axle, substantially as and for the purpose specified.

In testimony that I claim the above I have hereunto subscribed my name in the presence of two witnesses.

JOHN MARIAN LINDSEY.

Witnesses:
CHAS. I. GRAVES, Jr.,
GEORGE C. WHATLEY.